United States Patent
Amanuddin et al.

(10) Patent No.: US 8,621,462 B2
(45) Date of Patent: Dec. 31, 2013

(54) AUTONOMIC CUSTOMIZATION OF PROPERTIES OF A VIRTUAL APPLIANCE IN A COMPUTER SYSTEM

(75) Inventors: Riz Amanuddin, Laguna Beach, CA (US); Luis Alexandro Garcia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 13/041,516

(22) Filed: Mar. 7, 2011

(65) Prior Publication Data

US 2012/0233606 A1    Sep. 13, 2012

(51) Int. Cl.
  *G06F 9/455* (2006.01)
  *G06F 9/46* (2006.01)

(52) U.S. Cl.
  USPC .............................. 718/1; 718/100; 718/104

(58) Field of Classification Search
  None
  See application file for complete search history.

(56) References Cited

U.S. PATENT DOCUMENTS

| | | | |
|---|---|---|---|
| 7,266,821 B2 * | 9/2007 | Polizzi et al. | 718/100 |
| 2007/0078988 A1 * | 4/2007 | Miloushev et al. | 709/227 |
| 2009/0276771 A1 * | 11/2009 | Nickolov et al. | 717/177 |

* cited by examiner

*Primary Examiner* — Abdullah Al Kawsar
*Assistant Examiner* — Bradley Teets
(74) *Attorney, Agent, or Firm* — Martin & Associates, LLC; Bret J. Petersen

(57) ABSTRACT

A customizer autonomically customizes a virtual appliance by retrieving customization values for various customizable properties of a virtual machine from various providers to customize the virtual appliance in order to simplify deployment of the virtual appliance. The customization properties may include CPU properties, memory properties, storage properties, network properties and properties specific to the software in the virtual appliance. The customizer allows an end user to initiate autonomic customization of the virtual appliance at various times prior to deployment of the virtual appliance. The customizer also allows the user to provide additional customization upon execution.

13 Claims, 6 Drawing Sheets

Customization Table - Properties and Sources

| Customization Property | Provider 1 | Provider 2 |
|---|---|---|
| CPU | Rules in Customizer | Server Application |
| Memory | Pre-customized by IT admin | Rules in Customizer |
| IP Address | Web Service at datacenter | |
| User Name, Password | Web Service at Data Center | 3rd Party Service |
| Software - Backup | Web Service by creator of software | |
| Software - Firewall | Web Service by software creator | |
| Network | File with Network Information | Web Service At The Data Center |

FIG. 3

```
<ovf:ProductSection ovf:class "com.ibm.vsae.2_1.network-interface">
    <ovf:Info>System network interface configuration </ovf:Info>
    <ovf:Product>activate-network-interface</ovf:Product>
    <ovf:Version>0.1</ovf:Version>
        <ovf:Property ovf:key "ipaddr" ovf:label "" ovf:type "string"
        ovf:userConfigurable "true" ovf:value "192.168.254.10">
        <ovf:Description>IPv4 Address</ovf:Description>
    </ovf:Property>
        <ovf:Property ovf:key "domainname" ovf:label ""
        ovf:type "string"
        ovf:userConfigurable "true" ovf:value "mycompany.com">
        <ovf:Description>Domain Name</ovf:Description>
    </ovf:Property>
</ovf:ProductSection>
```

412 — Version/ipaddr property block
414 — domainname property block

FIG. 4

```
<ovf:ProductSection ovf:class "com.ibm.vsae.2_1.mysql5">

<ovf:Info>MySQL Configuration</ovf:Info>

<ovf:Product>activate-mysql5</ovf:Product>

<ovf:Version>0.1</ovf:Version>

<ovf:Property ovf:key "password" ovf:label "" ovf:type "string"
    ovf:userConfigurable "true" ovf:value "bluecloud001">
    <ovf:Description>MySql Password</ovf:Description>
</ovf:Property>

<ovf:Property ovf:key "user" ovf:label "" ovf:type "string"
    ovf:userConfigurable "true" ovf:value "isv">
    <ovf:Description>MySql User</ovf:Description>
</ovf:Property>

</ovf:ProductSection>
```

512 { (password property block)

514 { (user property block)

FIG. 5

AUTONOMIC CUSTOMIZATION OF PROPERTIES OF A VIRTUAL APPLIANCE IN A COMPUTER SYSTEM

BACKGROUND

1. Technical Field

This disclosure generally relates to computer systems, and more specifically relates to autonomic customization of a virtual appliance by retrieving customization values from various providers to customize the virtual appliance in order to simplify deployment.

2. Background Art

A virtual machine (VM) is a software implementation of a computer that executes software programs like a physical machine. A single physical machine may host one or more virtual machines. Virtual machines allow a physical machine to run multiple operating systems. A virtual appliance is a prebuilt software solution containing virtual machines and software applications that are integrated, managed, and updated as a package. Virtual appliances simplify the development and distribution of software applications, and shorten implementation time. A virtual appliance may be described using Open Virtualization Format (OVF). OVF is a developing platform-independent standard from the Distributed Management Task Force (DMTF) to describe virtual machine metadata and create portable virtual-machine packages.

Deployment of a virtual machine requires that the virtual machine be customized for the specific platform and hardware. The customization includes information such as: minimum, desired, and max memory and CPUs, storage information (amount, location, pools), and network information (DNS server, IP addresses of VMs, hostnames, gateway). The problem with deploying virtual machines is that the customization information can be very technical, and an end user, that is the person who will ultimately use the VMs, may not necessarily have the specialized knowledge of all the low level details required, especially considering that they vary by virtualization platform. Thus deploying a VM requires significant manual intervention by administrators with specialized knowledge.

BRIEF SUMMARY

The disclosure and claims herein are directed to autonomic customization of a virtual appliance by retrieving customization values from various providers to customize the virtual appliance in order to simplify deployment of the virtual appliance. A customizer retrieves customization values for various customizable properties of a virtual machine from customization providers to customize the virtual appliance. The customization properties may include CPU properties, memory properties, storage properties, network properties and properties specific to the software in the virtual appliance. The customizer allows an end user to initiate autonomic customization of the virtual appliance at various times prior to deployment. The customizer also allows the user to provide additional customization upon execution.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 3 is a table with examples of customizable properties and sources from which to retrieve customization values for the customizable properties;

FIG. 4 illustrates an example of an OVF file used by the customizer for retrieving customization values from appliance customization providers;

FIG. 5 illustrates another example of an OVF file used by the customizer for retrieving customization values from appliance customization providers.

DETAILED DESCRIPTION

Described herein is a system and method for autonomic customization of a virtual appliance by retrieving customization values from various providers to customize the virtual appliance in order to simplify deployment of the virtual appliance. A customizer retrieves customization values for various customizable properties of a virtual machine from customization providers to customize the virtual appliance. The customization properties may include CPU properties, memory properties, storage properties, network properties and properties specific to the software in the virtual appliance. The customizer allows an end user to initiate autonomic customization of the virtual appliance at various times prior to deployment. The customizer also allows the user to provide additional customization upon execution.

Figure 1:
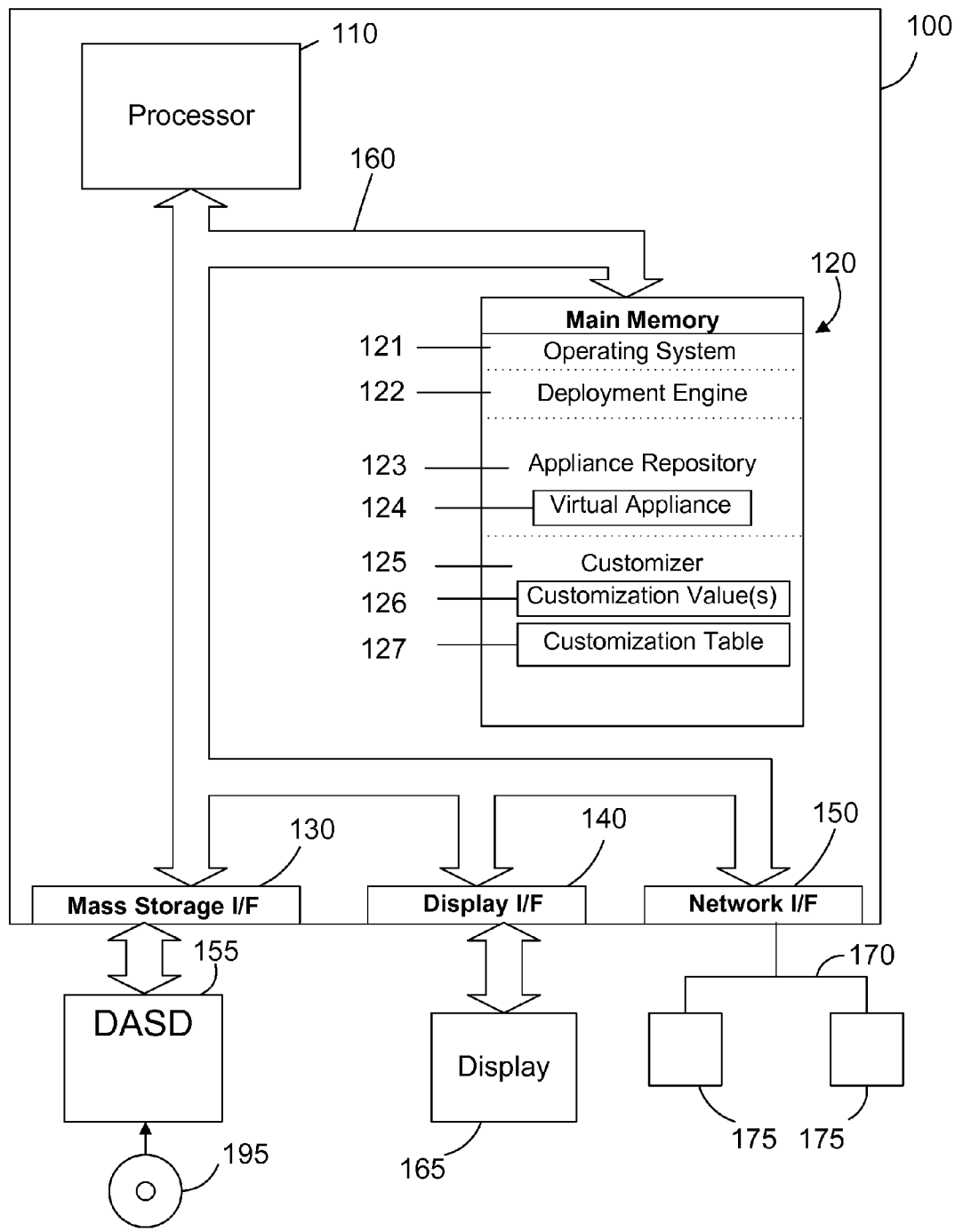
FIG. 1 is a block diagram of a computer system with a customizer that autonomically customizes a virtual appliance by retrieving customization values from various providers to customize the virtual appliance in order to simplify deployment of the virtual appliance.

Referring to FIG. 1, a computer system 100 is one suitable implementation of a computer system that includes a customizer as described herein. Computer system 100 is an International Business Machines Corporation (IBM®) Power System which can run multiple operating systems including the IBM® i operating system. However, those skilled in the art will appreciate that the disclosure herein applies equally to any computer system capable of being connected in a multi-nodal or distributing computing environment. For example, the computer system 100 could also represent a single node of a massively parallel computer such as IBM® Corporation's Blue Gene® computer system, or a node of a scalable performance cluster such as a Beowulf cluster. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable or computer recordable medium, such as direct access storage devices 155, to computer system 100. One specific type of direct access storage device 155 is a readable and writable CD-RW drive, which may store data to and read data from a compact disk (CD) 195.

Main memory 120 preferably contains an operating system 121. Operating system 121 is a multitasking operating system known in the industry as IBM® i operating system; however, those skilled in the art will appreciate that the spirit and scope of this disclosure is not limited to any one operating system. The memory further includes a deployment engine 122 that deploys a virtual appliance on the computer system or on a related computer system over the network. The memory 120 includes an appliance repository 123 with at least one virtual appliance 124. The memory 120 further includes a customizer 125 with customization values 126 and a customization table 127 as described herein. While the deployment engine 122, and the customizer 125 are shown to reside in the same physical machine in FIG. 1, these components will likely reside in different physical computers similar to computer 100 as shown but operate in the same manner as described herein. Further, the appliance repository 123 will most likely be stored in a block of permanent shared storage assessable to computer 100 and loaded into local memory 120 (most likely volatile memory) as needed. The permanent storage holding the appliance repository 123 could be a local direct access storage device 155 or other remote memory storage outside the physical machine 100 but assessable to the customizer 125 on computer 100.

Computer system 100 utilizes well known virtual addressing mechanisms that allow the programs of computer system 100 to behave as if they only have access to a large, single storage entity instead of access to multiple, smaller storage entities such as main memory 120 and direct access storage device (DASD) 155. Therefore, while operating system 121, deployment engine 122, appliance repository 123, virtual appliance 124, the customizer 125, the customization values 126, and the customization table 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the customizer 125.

Although computer system 100 is shown to contain only a single processor and a single system bus, those skilled in the art will appreciate that a customizer as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
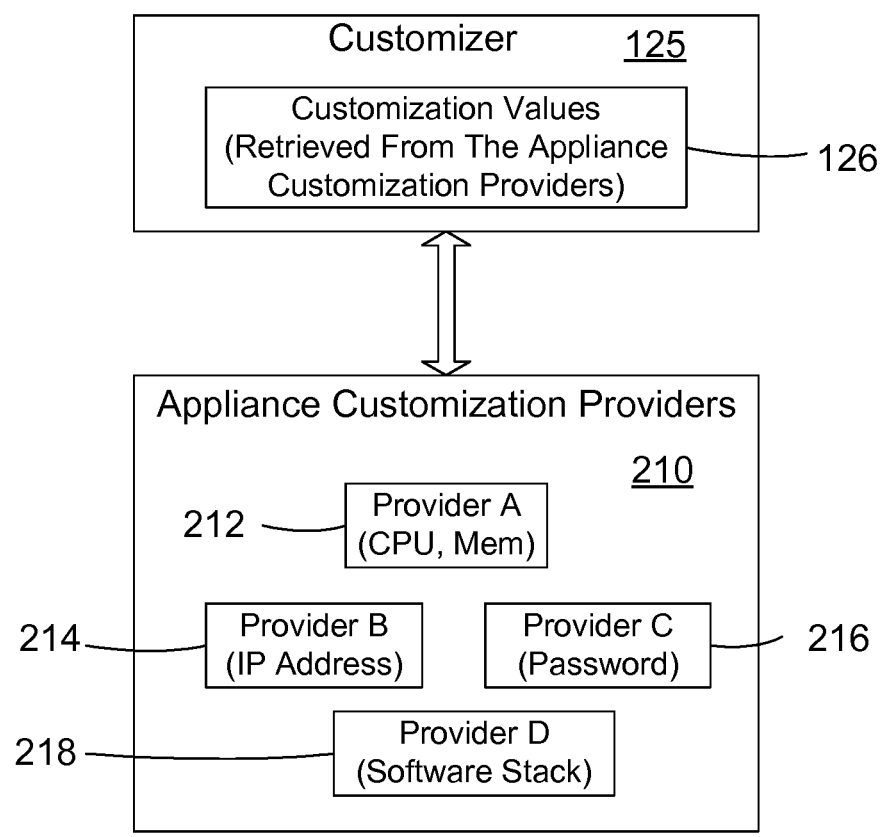
FIG. 2 is a block diagram that illustrates a customizer retrieving customization values from appliance customization providers.

FIG. 2 illustrates a block diagram of a customizer 125 retrieving customization values 126 from appliance customization providers 210. The appliance customization providers 210 may provide one or more related customization values and there may be more than one provider for a single customization property. Several example customization providers are illustrated. These examples are for illustrative purposes only and do not limit the customization values to be provided by any particular source or grouped together in any particular manner. In the example shown in FIG. 2, Provider A 212 includes customization values related to the central processing unit (CPU) or processor and memory. Provider B 214 provides customization values related to IP address. Provider C 216 has customization values related to passwords. Provider D 218 has software stack customization values.

FIG. 3 illustrates a customization table 127 of customization properties 312 and potential customization providers 210 to provide customizable values for the customization properties 312. The customization properties are listed in the left column with one or two corresponding providers 210 for each customization property in the other two columns. The customizer 125 may use the customization table to determine known customization properties 312 of an associated virtual appliance. The customizer 125 may then use the customization table 127 to retrieve customization values 126 from appliance customization providers 210.

Again referring to FIG. 3, the customization providers 210 for the customization values 126 may include any number of sources internal or external to the customizer and the local computer system. For example, the customization provider may include a list of rules or guidelines that reside in the physical host's file system or somewhere else, predefined values hosted over a Web service by the software stack or product providers, a server application with customization values provided by the data center or a system administrator, a web service provided by the Virtual Appliance creator, etc. A customization property could also be a web service or application provided as a service by a third party to provide the customization values as described herein. For example, a third party could provide a service that generates usernames and passwords for the virtual appliance. As used herein, a Web service is a method of communicating between two computers over a network, in this case, the Internet. Also, as used herein, a data center is a facility used to house computer systems and associated components, such as telecommunications and storage systems. It may also include backup power supplies, redundant data communications connections, environmental controls and security devices, etc.

The customizer may be executed at different times to customize a virtual appliance (VA). The customizer primarily will be executed to build, update or launch a VA as described by the examples herein. However, the customizer could also be executed at other times. The customizer may be executed by the user to build a VA 124 that is then stored in the appliance repository 123 as shown in FIG. 1. The customizer may also be executed as described herein to allow the user to retrieve and update an existing VA stored in the appliance repository 123. For example, if a VA is changed by adding a virtual machine or a property is changed then the customizer could be run again to update the customization values. In other cases, the customizer may also be executed just prior to the VA being deployed to customize the VA. When the user deploys the VA with the deployment engine 122 (FIG. 1) the user may be given the option to update the autonomic customization values or add any additional customization values.

We will now consider some examples of the customizer retrieving customization values to customize the VA. The customizer (125 in FIG. 2) identifies known customization properties of the VA and potential sources of the corresponding customization values using the customization table (127 in FIG. 3) or similar data stored in any suitable data format. The customizer then requests or otherwise obtains the customization values by contacting the customization source. In a preferred method, the customizer sends an Open Virtualization Format (OVF) file to the customization source to request the customization values. The customization source then responds by sending back the OVF file with the customization values populated in the file. Alternatively, just a section of the OVF could be sent, or just a property name could be sent to signal the provider to return a customization value. Other file formats and communication methods could similarly be used by the customizer to contact the customization sources for customization values.

FIG. 4 illustrates an example of OVF used by the customizer to obtain customization values. This OVF formatted data is metadata for describing the customization values needed to customize the VA. In this example, the customizer uses the data in FIG. 4 to obtain the customization values from a web service. In the OVF code shown in FIG. 4, the properties are "ipaddr" 412 and "domainname" 414. The "ipaddr" property specifies the IP address that the resulting virtual machine will have when it's created. The end user, the person that is going to use that virtual machine may not want to keep track of a list of IP addresses available for the various virtual machines that may be deployed in his/her datacenter. The customizer contacts a Web service created by the data center administrator that keeps track of all the available IP addresses and sends the OVF file shown in FIG. 4 to obtain the IP address to customize the VA. In this example, the domainname 414 is sent as a context value to give the customization provider a context to provide a corresponding customization value. Thus the domainname 414 tells the customization provider the domain that the VA is operating on so that the web service provided by the data center can provide an appropriate IP address. In this example, it is advantageous for the customizer to run just prior to deploying (as opposed to when the virtual appliance was added to the repository). This ensures that the IP addresses will not be reserved until the last moment before it is needed.

FIG. 5 illustrates another example of OVF code used by the customizer to obtain customization values. The OVF code in FIG. 5 illustrates two properties username 512 and password 514 that will be the credential for the MySQL Database that the resulting Virtual Machine will have. In order not to store the username and password for the database in the actual file, which may not be secure, these two properties can be filled out at just the last moment before deployment by having the customizer contact a Web service created in the datacenter by the administrator that will generate a username and password to customize the properties, and send those properties to the deployment engine encrypted or over a secure channel for security.

In another example, the customizer is utilized to customize hardware properties of the VA such as the number of CPUs 314 and memory 316 shown in FIG. 3. The CPU customization property 314 would refer to the number of virtual processors allocated to the VA by the deployment engine upon deployment. The customization providers for this customization property could include a set of rules in the customizer or a server application which calculates the number of CPUs need for the VA. The number of CPUs allocated may depend on the number of physical CPUs in the system and/or a quality of service standard for the VA that indicates a satisfactory response level for the VA. The customizer customizes the memory property in a similar manner as described above for the number of CPUs.

As shown in FIG. 3, the customizer also provides autonomic customization of customization properties for the software stack that makes up the virtual machine. For example the software stack may include antivirus software, or backup software. The optimizer may have a property that specifies how often the antivirus software or the backup software runs. The customizer could contact a web service created by the user's data center that specifies how often and when to run this software. Similarly there could be firewall software that has properties when to update one or more access control lists. As will be readily understood by those skilled in the art there could be many other types of software stack properties that could be autonomically customized by the customizer in a similar manner. The customizer also provides autonomic customization of customization properties for the network configuration of the VA. For example, the customizer could contact a file external to the system or a web service at the data center to obtain customization values such as the IP address and hostnames available for each of the virtual machines in the virtual appliance, the gateway information, and main and back-up domain name system (DNS) servers.

Figure 6:
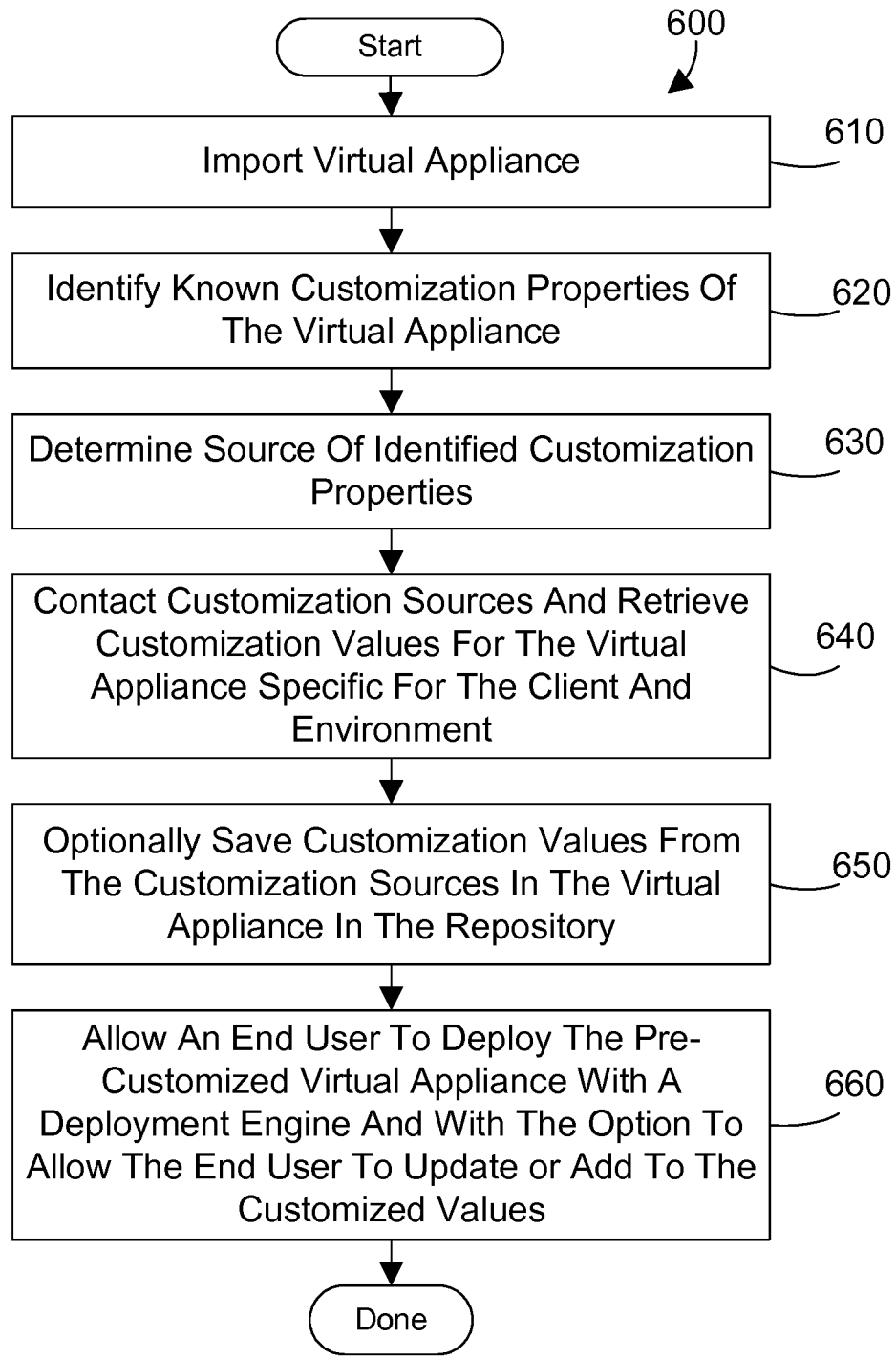
FIG. 6 is a method flow diagram for a customizer as claimed herein.

FIG. 6 shows a method 600 for customizing a virtual appliance as claimed herein. The steps in method 600 are preferably performed by the customizer 125 (FIG. 1), but portions of the method may also be performed by other software associated with the computer system. The customizer may be invoked at various times to autonomically customize the VA as described in the paragraphs above. First, import the virtual appliance to be customized (step 610). Next, identify known customization properties of the virtual appliance (step 620). Then determine a source for the identified customization properties (step 630). Contact the determined customization sources and retrieve customization values for the customization properties that are specific to the client and environment of the virtual appliance (step 640). Optionally, then save the customization values retrieved from the customization sources in the virtual appliance, where the virtual appliance may be stored in a virtual appliance repository (step 650). Allow the end user to deploy the customized virtual appliance and optionally allow the end user to update or add any customization values (step 660). The method is then done.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:
1. An apparatus comprising:
   a computer system comprising at least one computer with a processor and a memory coupled to the processor;
   a virtual appliance, imported into the memory, for deployment on a virtual machine where the virtual appliance has a plurality of customization properties with corresponding customization values, wherein the customization properties include at least one of CPU properties, memory properties, storage properties, network properties and software specific properties;
   a customizer that assists a user to customize the virtual appliance, the customizer residing in the memory, wherein the customizer determines a customization provider to provide a customization value for each of the plurality of customization properties;
   wherein the customizer retrieves the customization values for each of the plurality of customization properties from the determined source customization provider;
   wherein the virtual appliance is saved with the customization values in a virtual appliance repository;
   wherein the steps of retrieving customization properties of the virtual appliance and determining the source customization provider for the identified customization properties includes accessing the memory having a customization table with customization properties for the virtual appliance and corresponding source customization providers for the customization properties; and
   wherein the customization values include number of central processing units, size of memory, an internet protocol address, and a username of a user of the virtual machine.

2. The apparatus of claim 1 wherein the customization provider is a server application at a location remote to the customizer.

3. The apparatus of claim 1 wherein the customization provider is a web service at a remote data center.

4. The apparatus of claim 1 wherein the customizer allows the user an option to update any of the customization values prior to deployment of the virtual appliance in a physical computer.

5. A computer-implemented method for customizing a virtual appliance with a customizer stored in a memory of a computer system, the method comprising the steps of:
- importing a virtual appliance into the memory;
- identifying customization properties of the virtual appliance, where the customization properties have corresponding customization values, wherein the customization properties include at least one of CPU properties, memory properties, storage properties, network properties and software specific properties;
- determining a source customization provider for each of the identified customization properties;
- retrieving customization values from the determined source customization provider for each of the identified customization properties;
- saving the virtual appliance with the customization values in a virtual appliance repository;
- deploying the virtual appliance with the customization values that are saved with the virtual appliance;
- wherein the steps of identifying customization properties of the virtual appliance and determining the source customization provider for the identified customization properties includes accessing the memory having a customization table with customization properties for the virtual appliance and corresponding source customization providers for the customization properties; and
- wherein the customization values include number of central processing units, size of memory, an internet protocol address, and a username of a user of the virtual machine.

6. The method of claim 5 further comprising the step of allowing an end user to update any of the customization values.

7. The method of claim 5 wherein the customization provider is a server application at a location remote to the customizer.

8. The method of claim 5 wherein the customization provider is a web service at a remote data center.

9. A computer-implemented method for customizing a virtual appliance with a customizer stored in a memory of a computer system, the method comprising the steps of:
- importing a virtual appliance into the memory;
- identifying customization properties of the virtual appliance, where the customization properties include at least one of CPU properties, memory properties, storage properties, network properties and software specific properties;
- determining a source customization provider for each of the identified customization properties;
- retrieving customization values from the determined source customization provider for each of the identified customization properties by utilizing an Open Virtualization Format (OVF) file to request and retrieve the customization values;
- saving the virtual appliance with the customization values in a virtual appliance repository;
- allowing an end user to update or add to any of the customization values that are saved with the virtual appliance;
- deploying the virtual appliance, with the customization values that were saved, on a virtual machine;
- wherein the steps of identifying customization properties of the virtual appliance and determining the source customization provider for the identified customization properties includes accessing the memory having a customization table with customization properties for the virtual appliance and corresponding source customization providers for the customization properties;
- wherein the source customization providers are server applications at a location remote to the customizer; and
- wherein the customization values include number of central processing units, size of memory, an internet protocol address, and a username of a user of the virtual machine.

10. An article of manufacture comprising software stored on a non-transitory computer readable storage medium for execution on a computer processor, the software comprising:
- a customizer, stored in memory, that assists a user to customize a virtual appliance, imported into the memory, with a plurality of customization properties for deployment on a virtual machine,
- wherein the customization properties have corresponding customization values, wherein the customization properties include at least one of CPU properties, memory properties, storage properties, network properties and software specific properties;
- wherein the customizer determines a source customization provider to provide a customization value for each of the plurality of customization properties and retrieves the customization values for each of the plurality of customization properties from the determined source customization provider;
- wherein the virtual appliance is saved with the customization values in a virtual appliance repository;
- wherein the steps of retrieving customization properties of the virtual appliance and determining the source customization provider for the identified customization properties includes accessing the memory having a customization table with customization properties for the virtual appliance and corresponding source customization providers for the customization properties; and
- wherein the customization values include number of central processing units, size of memory, an internet protocol address, and a username of a user of the virtual machine.

11. The article of manufacture of claim 10 wherein the customization provider is a server application at a location remote to the customizer.

12. The article of manufacture of claim 10 wherein the customization provider is a web service at a remote data center.

13. The article of manufacture of claim 10 wherein the customizer allows the user an option to update any of the customization values prior to deployment of the virtual appliance.

* * * * *